United States Patent Office 3,256,094
Patented June 14, 1966

3,256,094
METHOD OF RAISING SWINE
Wise Burroughs, Vaughn C. Speer, and Virgil W. Hays, Ames, Iowa, assignors to Iowa State University Research Foundation, Inc., Ames, Iowa, a corporation of Iowa
No Drawing. Filed May 24, 1962, Ser. No. 197,261
7 Claims. (Cl. 99—2)

This invention relates to a method of raising swine which has particular advantage where the swine are being raised for meat production.

The economics of raising domestic animals for meat production involves many factors. However, two of the most important of these factors are feed efficiency and rate of weight gain. Feed efficiency is usually computed as pounds of feed per pound of gain, while rate of weight gain is on the basis of pounds of gain per day (24 hours). It is desired to increase the rate of weight gain as an end in itself because this enables the swine or other meat-producing animals to be brought to marketable weight in a shorter period of time, thereby permitting more animals to be raised per year in a given facility. The increase in feed efficiency may result in an even greater saving to the animal raiser, since the cost of the feed is the most significant of all the cost factors and may determine whether the animals will be sold at a profit or at a loss. The rate of weight gain and feed efficiency are not necessarily directly related. For example, the rate of weight gain may be increased at the expense of feed efficiency, or the feed efficiency may be increased while the rate of weight gain is decreased. The most desirable condition, of course, is when both factors can be improved together.

An object of the present invention is to provide a method of raising swine wherein the rate of weight gain and/or feed efficiency of the swine can be substantially increased. A further object is to provide a method wherein both feed efficiency and rate of weight gain are appreciably increased. Further objects and advantages will be indicated in the following detailed specification.

Heretofore, 2-mercaptoimidazole compounds, such as 1-methyl 2-mercaptoimidazole, have been administered to beef cattle and sheep in combination with estrogens, such as diethylstilbestrol, for the purpose of increasing the rate of weight gain and feed efficiency. The results obtained with one species of animal frequently do not apply to other species, and this is particularly true as between ruminants and non-ruminants. For example, estrogens are not effective with swine. The surprising nature of the present invention is indicated by the fact that it is effective only after the swine have reached a certain stage of maturity, and then only if the swine are fed no more than a minimum amount of vitamin A.

The method of the present invention is applicable generally to swine, including gilts, barrows, boars, stags, and sows. In the raising of swine for meat production, it can be applied with particular advantage to gilts and barrows. To achieve the desired results, the swine will be in their growing or immature stage, but very young pigs should not be used. Based on presently available evidence, the swine should be at least 12 weeks of age for successful application of the method. The maximum advantages of the method are obtained after the swine reach an age of 16 weeks. The method may continue to be used as long as the swine are immature and growing, but it usually will not be desirable to apply the method to swine more than one year of age. The method works exceptionally well with swine up to 36 weeks of age, and swine raised for meat production are commonly marketed prior to 36 weeks of age. Consequently, the method is well adapted for the commercial raising of swine. For example, the method can usually be applied to swine after they reach a weight of 125 pounds, and continued until the swine are ready for market at weights of 200 to 250 pounds or more. Maximum results can be obtained by applying the method to swine weighing 150 pounds or more, since swine of this size will usually be at least 16 weeks old.

In practicing the method of this invention, a 2-mercaptoimidazole compound is orally administered to the swine at a rate of from 20 to 160 milligrams (mg.) per 100 pounds of body weight per 24 hours. Optimum results can usually be obtained within the range from 60 to 100 milligrams of the 2-mercaptoimidazole compound per 100 pounds of body weight per 24 hours, and therefore this range is preferred. The 2-mercaptoimidazole compound can be selected from the group consisting of 2-mercaptoimidazole and 1-alkyl 2-mercaptoimidazoles wherein the alkyl group contains from 1 to 5 carbon atoms. One preferred compound is 1-methyl 2-mercaptoimidazole. Other compounds having similar properties are 2-mercaptoimidazole, 1-ethyl 2-mercaptoimidazole, 1-propyl 2-mercaptoimidazole, 1-butyl 2-mercaptoimidazole, and 1-isopentyl 2-mercaptoimidazole. The 2-mercaptoimidazole compound can be administered in a number of different ways. One suitable procedure which provides excellent control of the quantity administered is to dry mix the 2-mercaptoimidazole compound with the complete swine ration, a pre-mix of the compound being first prepared to assure uniform distribution in the much larger volume of the complete ration. The quality of the 2-mercaptoimidazole to be incorporated in the complete ration can be determined with sufficient accuracy on the basis that immature, growing swine of at least 12 weeks of age normally consume about 5% of their weight per day in food. Satisfactory results can usually be obtained by incorporating from 15 to 25 mg. of the 2-mercaptoimidazole compound per pound of complete feed.

In the raising of swine it is frequently desirable to feed home-grown or purchased grains as the separate feed in conjunction with a second supplementary feed containing supplementary protein, minerals, vitamins, etc. Such supplementary protein-mineral-vitamin feeds are widely used in swine feeding practice at the present time. Since these supplementary feeds are normally consumed at the rate of about 1 pound per each 7 pounds of grain, the 2-mercaptoimidazole compound can be incorporated in the swine feed supplement. For example, from 100 to 200 mgs. of the 2-mercaptoimidazole compound can be incorporated in the supplement. The 2-mercaptoimidazole compound can also be administered by dissolving it in the drinking water.

In order to obtain the desired growth promotant response from the 2-mercaptoimidazole compound, it has been found to be essential to control the quantity of vitamin A in the diet. The diet for the swine should contain an average of less than 1500 International Units (I.U.) of vitamin A activity per pound of ration. It will be understood that this is on a total ration basis. The results are still further improved when the vitamin A level is limited to less than 1,000 I.U. per pound of ration. The optimum range is from 200 to 800 I.U. per pound of ration. It will be understood that the swine should receive at least enough vitamin A to meet their minimum nutritional requirements and to avoid any marked vitamin A deficiency. This requirement, however, can be achieved within the ranges specified, and without the administration of excessive vitamin A, either as true vitamin A, or as carotene. For the purpose of the present invention, the vitamin A activity of the ration should be computed on the basis of total vitamin A activity, including both true vitamin A and carotene.

In another phase of the present invention, a thyroxine-active substance is administered in conjunction with the 2-mercaptoimidazole compound. More specifically, from .0005 to .0025 mg. of thyroxine activity can be employed per milligram of the 2-mercaptoimidazole compound. Thyroxine itself may be employed, or other thyroxine-active material, such as a thyroprotein like iodinated casein. Because of their availability and low cost, thyroproteins are particularly desirable. For example, the iodinated casein sold under the trade name Protamone is suitable. This product may contain an amount of thyroxine activity equal to from 1 to 3% of its weight, and is commonly manufactured and sold with a 1% level of activity. The thyroxine-active material can be incorporated in the complete feed ration for the swine, or in the swine feed supplement, as previously described with respect to the 2-mercaptoimidazole compound.

The following examples illustrate the present invention in greater detail.

*Example I*

Castrated males (barrows) and females (gilts) weighing approximately 150 pounds per pig and averaging 5 months of age were self-fed the No. 2 ration listed below containing 20 milligrams of 1-methyl 2-mercaptoimidazole per pound of ration.

SWINE RATIONS

| Ingredient | No. 1 | No. 2 | No. 3 |
|---|---|---|---|
| Ground yellow corn | 1,638 | 1,626 | 1,614 |
| 50% soybean oil meal | 270 | 270 | 270 |
| Limestone | 16 | 16 | 16 |
| Dicalcium phosphate | 24 | 24 | 24 |
| Sodium chloride (salt) | 10 | 10 | 10 |
| Trace mineral premix | 2 | 2 | 2 |
| Vitamin-antibiotic premix | 40 | 40 | 40 |
| Tapazole premix | None | 12 | 12 |
| Protamone premix | None | None | 12 |
| Total (lbs.) | 2,000 | 2,000 | 2,000 |

The Tapazole premix contained 160 grams of Tapazole powder (1-methyl 2-mercaptoimidazole) mixed with 47.6 lbs. of ground corn. The Protamone premix contained 14 grams of Protamone (1% thyroxine iodinated casein) mixed with 21.0 lbs. of ground corn. The vitamin-antibiotic premix contained 5.0 grams of vitamin $D_2$ (142,000 I.U./gm.), 0.8 lbs. Merck vitamin mixture No. 84, 2.0 lbs. Aurofac 10, 0.5 lbs. Merck vitamin $B_{12}$ mixture (20 mg./lb.) and 36.5 lbs. of ground yellow corn.

The pigs receiving the No. 2 ration with Tapazole gained 48 lbs. liveweight during a three-week feeding period which was 8 lbs. more than the gain of 40 lbs. made by pigs receiving the similar ration except for the absence of Tapazole (Ration No. 1). The feed required to produce each pound of gain in the pigs receiving Tapazole was improved and decreased by 16 percent as compared with the pigs receiving the No. 1 ration devoid of Tapazole. Also, the pigs receiving the Tapazole appeared to have superior pork carcasses when slaughtered as measured by a lesser amount of external fatness.

The pigs receiving the combination of Tapazole and Protamone (Ration No. 3) during the same three-week period gained 51 pounds liveweight which was 11 lbs. more than the gain (40 lbs.) made by pigs receiving a similar ration except for the absence of the Tapazole-Protamone combination. The feed required to produce each pound of gain in the pigs receiving the Tapazole-Protamone combination was decreased by 18 percent as compared to the performance of the pigs receiving the No. 1 ration. Again the pigs receiving the Tapazole-Protamone combination appeared to have superior pork carcasses when slaughtered as compared to the pigs receiving a similar ration except for the Tapazole-Protamone addition.

The tabular performance of these three groups of pigs is as follows:

PERFORMANCE OF PIGS ON DIFFERENT RATIONS

| 21-Day Results | No. 1 | No. 2 | No. 3 |
|---|---|---|---|
| Initial liveweight (lbs.) | 150 | 148 | 151 |
| Final liveweight (lbs.) | 190 | 196 | 202 |
| Average daily gain (lbs.) | 1.90 | 2.29 | 2.42 |
| Average daily ration (lbs.) | 7.30 | 7.38 | 7.66 |
| Feed/pound gain (lbs.) | 3.84 | 3.22 | 3.17 |
| Backfat probe (inches) | 1.61 | 1.46 | 1.40 |

*Example II*

A standard commercial swine feed supplement, containing supplementary proteins, minerals, and vitamins, is added to a measured quantity of 1-methyl 2-mercaptoimidazole and iodinated casein. The iodinated casein contains a 1% thyroxine activity. Since the supplement is designed to be fed to swine at the rate of approximately 1 pound per 7 pounds of grain, 320 grams of 1-methyl 2-mercaptoimidazole and 64 grams of the iodinated casein is used per ton of the supplement, the added ingredients being first mixed with a small portion of the supplement to form a premix, and then the premix being thoroughly blended and dry mixed with the remainder of the supplement to obtain a uniform distribution of the added ingredients. The resulting supplement is then ready for use in practicing the present invention.

While in the foregoing specification this invention has been described in considerable detail and specific embodiments thereof have been set forth, it will be apparent to those skilled in the art that the invention is capable of other embodiments and that many of the details set forth can be varied considerably without departing from the basic principles of the invention.

We claim:

1. The method of raising swine, comprising feeding to immature growing swine of at least 12 weeks of age a diet containing at least 200 but less than 1000 I.U. of vitamin A activity per pound of total ration, and orally administering to said swine a 2-mercaptoimidazole compound at the rate of from 20 to 160 mg. thereof per 100 pounds of body weight per 24 hours, said compound being selected from the group consisting of 2-mercaptoimidazole and 1-alkyl 2-mercaptoimidazole wherein the alkyl group contains from 1 to 5 carbon atoms.

2. The method of raising swine, comprising feeding to immature growing swine of at least 12 weeks of age a diet containing less than 1000 I.U. of vitamin A activity per pound of total ration, and orally administering to said swine from 60 to 100 milligrams of 1-methyl 2-mercaptoimidazole per 100 pounds of body weight per 24 hours in combination with a thyroprotein providing from .0005 to .0025 milligram of thyroxine activity per milligram of said 1-methyl 2-mercaptoimidazole.

3. The method of raising swine, comprising feeding to immature growing swine of at least 16 weeks of age a diet containing at least 200 but less than 1000 I.U. of vitamin A activity per pound of total ration, and orally administering to said swine a 2-mercaptoimidazole compound at the rate of from 60 to 100 milligrams thereof per 100 pounds of body weight per 24 hours, said compound being selected from the group consisting of 2-mercaptoimidazole and 1-alkyl 2-mercaptoimidazole wherein the alkyl group contains from 1 to 5 carbon atoms.

4. The method of raising swine, comprising feeding to swine of from 12 to 36 weeks of age a diet containing less than 1000 I.U. of vitamin A activity per pound of total ration, orally administering to said swine a 2-mercaptoimidazole compound and also orally administering to said swine a thyroprotein, said 2-mercaptoimidazole compound being administered at a rate of from 20 to 160 mg. thereof per 100 pounds of body weight per 24 hours and said thyroprotein being administered at a rate of from .0005 to .0025 milligram of thyroxine activity per milligram of said 2-mercaptoimidazole compound, said compound being selected from the group consisting of 2-mercaptoimidazole and 1-alkyl 2-mercaptoimidazole wherein the alkyl group contains from 1 to 5 carbon atoms.

5. The method of raising swine, comprising feeding to swine of from 12 to 36 weeks of age a diet containing from 200 to 800 I.U. of vitamin A activity per pound of total ration, and orally administering to said swine from 60 to 100 mg. of 1-methyl 2-mercaptoimidazole per 100 pounds of body weight per 24 hours in conjunction with a thyroprotein providing from .0005 to .0025 milligram of thyroxine activity per milligram of said 1-methyl 2-mercaptoimidazole.

6. In the raising of swine, the combination of steps comprising orally administering to swine of from 12 to 36 weeks of age a 2-mercaptoimidazole compound, and also orally administering to said swine a thyroprotein, said 2-mercaptoimidazole compound being administered at a rate of from 20 to 160 mg. thereof per 100 pounds of body weight per 24 hours, and said thyroprotein being administered at a rate of from .0005 to .0025 mg. of thyroxine activity per milligram of said 2-mercaptoimidazole compound, said compound being selected from the group consisting of 2-mercaptoimidazole and 1-alkyl 2-mercaptoimidazole wherein the alkyl group contains from 1 to 5 carbon atoms.

7. The method steps of claim 6 wherein said 2-mercaptoimidazole compound is 1-methyl 2-mercaptoimidazole.

References Cited by the Examiner

UNITED STATES PATENTS

| 2,456,515 | 12/1948 | Kamlet et al. | 99—2 |
| 2,881,112 | 4/1959 | Mattox et al. | 99—2 |
| 2,977,230 | 3/1961 | Brent | 99—2 |

A. LOUIS MONACELL, *Primary Examiner.*

D. DONOVAN, *Assistant Examiner.*